UNITED STATES PATENT OFFICE.

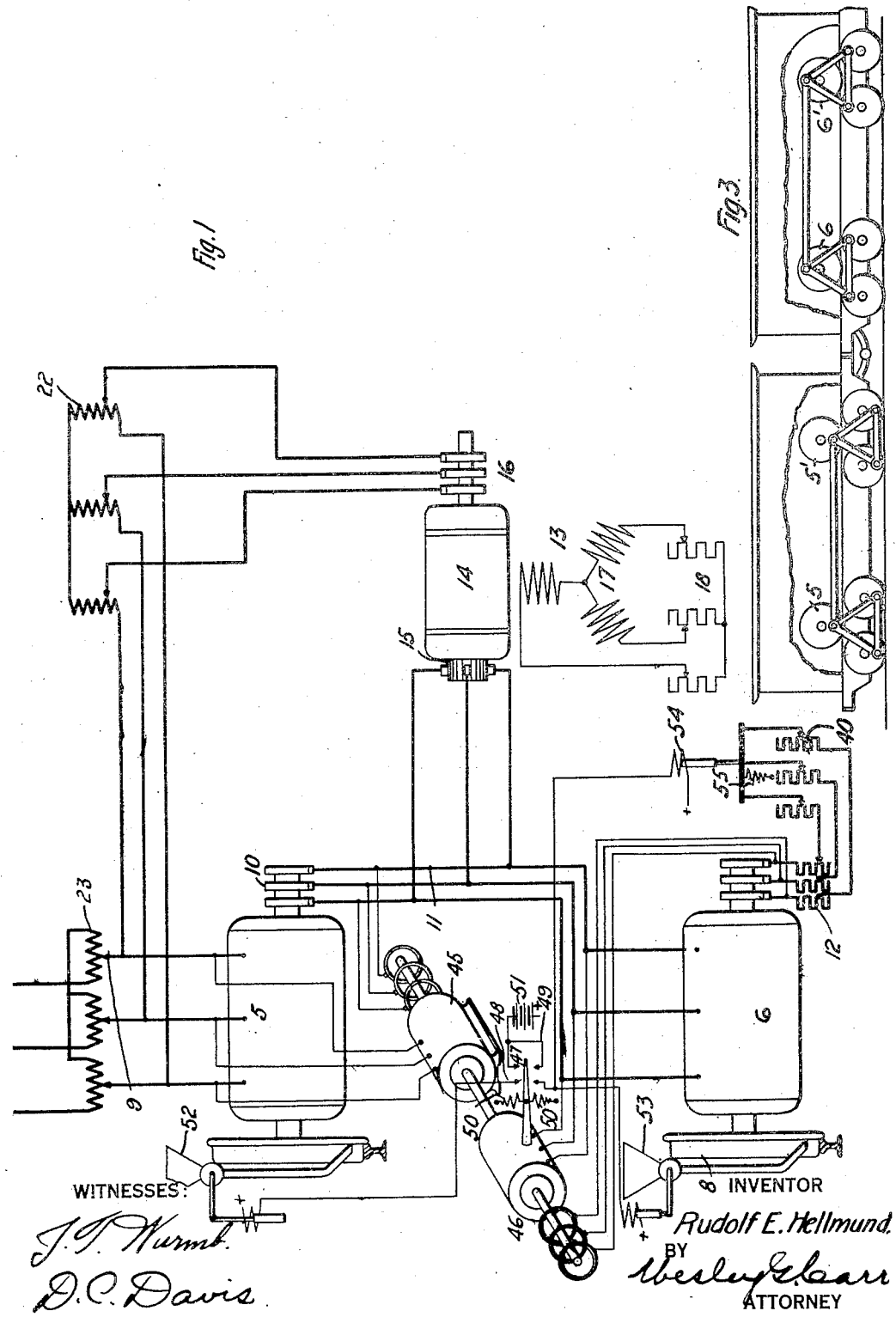

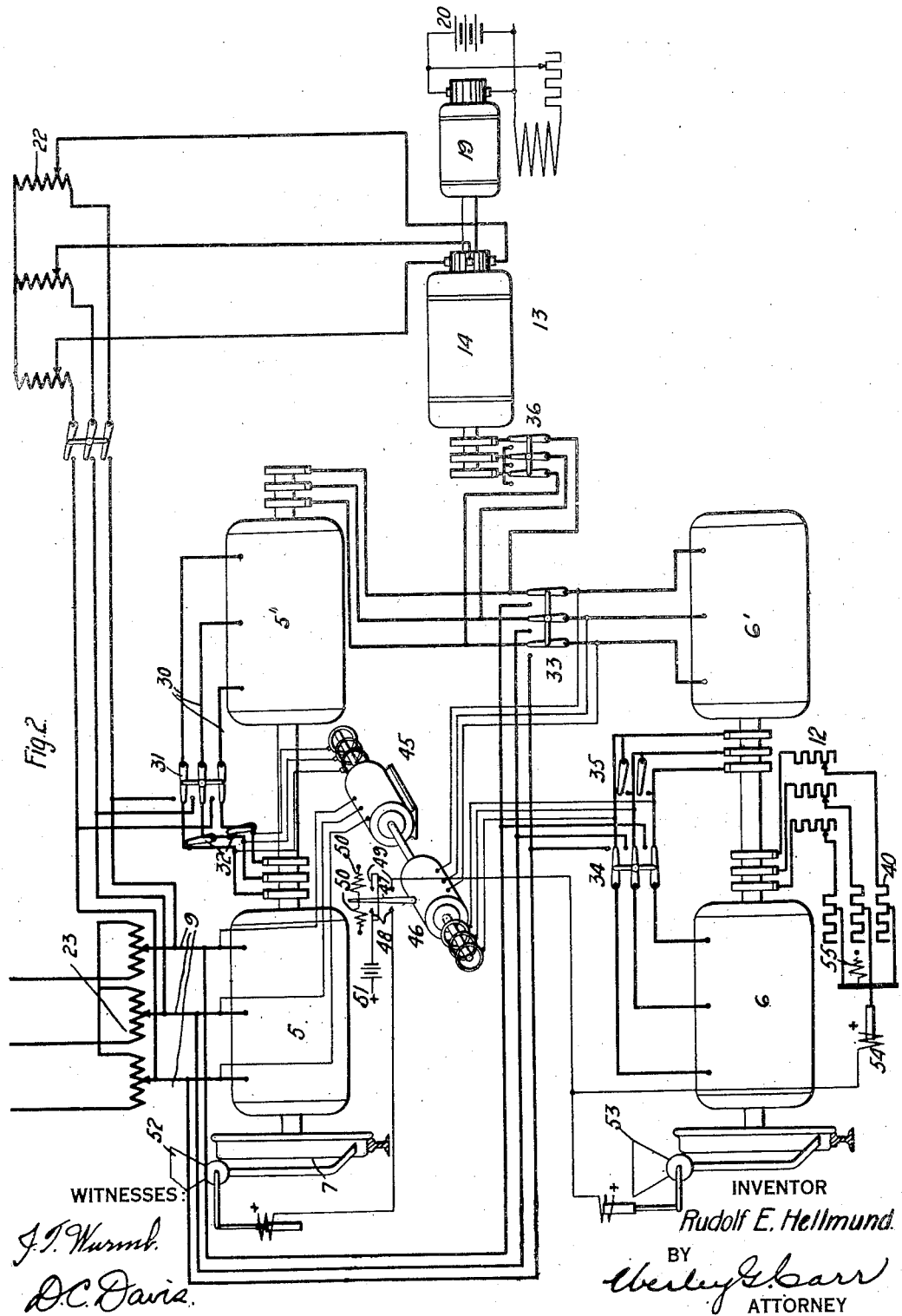

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL FOR INDUCTION-MACHINES.

1,376,432.  Specification of Letters Patent.  Patented May 3, 1921.

Application filed August 7, 1917. Serial No. 184,796.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Control for Induction-Machines, of which the following is a specification.

My invention relates to systems of control for induction machines, and it has for its object to provide a system of the character designated whereby induction machines which are not mechanically coupled may be operated in cascade, with a predetermined load distribution therebetween.

A further object of my invention is to provide means whereby a plurality of induction motors may be simply, effectively and efficiently controlled in speed over a wide range.

In the accompanying drawings, Figure 1 is a diagrammatic view of a pair of induction machines, together with associated supply circuits and auxiliary apparatus embodying one form of my invention, Fig. 2 is a diagrammatic view of a modification of the embodiment shown in Fig. 1, being adapted for the control and load adjustment of four propulsion machines; and Fig. 3 is a side view of a locomotive embodying an arrangement of motors in accordance with my invention, parts being broken away.

The cascade operation of induction motors which are mechanically coupled is a comparatively simple matter, as the relative speeds and, therefore, the relative loads on said motors, are fixed. When, however, it is attempted to cascade or concatenate two induction motors which are not rigidly mechanically coupled, it is difficult to obtain a proper load distribution therebetween. Thus, if the two motors be mounted on the two halves of an articulated locomotive, so that it is impossible to mechanically interconnect them, the slippage of the drivers connected to the first or high-frequency unit in the cascade set permits the speeding up of the secondary member of said unit, thereby lowering the frequency and voltage thereof. There is thus a deficiency in the energy supplied to the succeeding unit in the cascade set because of the lowering in the voltage supplied thereto. When, however, on the other hand, the drivers connected to the last or low-frequency motor slip, the secondary voltage and frequency of said motor increase, resulting in an increase in the primary back electromotive force thereof. The effect is the same as that of cutting in resistance in the secondary circuit of an ordinary induction motor, causing the first or high-frequency motor in the cascade set to draw less energy from the source than it is in a position to use.

Under the first named condition, the frequency of the current in the connection between the two motors is lower than is desired for load equalization and, under the second condition, with slippage in the low-frequency motor, the frequency of the current in the intervening mains is higher than is desired for proper load division.

In accordance with my invention, I connect two or more motors, which are not mechanically coupled, in cascade to a source of alternating current and I then insert an adjustable frequency changer in a connection between said source and an intermediate point in said cascade system.

I further associate with said system two auxiliary electro-responsive means which are energized respectively in accordance with the torques of the main motors. Said auxiliary means are normally opposed to each other and, when the two motors are operating with the desired relative load distribution, their opposing torques or forces are equal. If either motor slips its driver, said auxiliary devices are unbalanced and operate to send the slipping drivers or to otherwise restore torque thereto. Furthermore, the action of said auxiliary apparatus is such that, if the last motor in the cascade set loses its torque, as by slipping, its secondary resistance is temporarily increased.

While I have discussed and shall discuss my invention principally in connection with induction machines employed as motors, it should be distinctly understood that their use as generators in recuperation is similarly contemplated.

Referring to the drawing for a more detailed understanding of my invention, I show two induction motors at 5 and 6, respectively, in Fig. 1. Said motors are preferably of the ordinary polyphase type and are shown as applied to railway propulsion, being directly connected to traction wheels 7 and 8. Polyphase energy may be supplied to the primary member of the motor 5 through mains 9 from any suitable source, such, for example, as a phase-converter energized from a single-phase trolley (not shown), as is well known in railway traction. The secondary winding of the motor 5 terminates in suitable slip rings 10 which are connected to the primary member of the motor 6 by leads 11. The secondary member of the motor 6 is closed through adjustable rheostats 12 and 40.

A frequency-converter 13 is employed to carry out my invention and may take any one of a variety of forms, being shown as comprising an armature 14 provided with a polyphase commutator 15 and with slip rings 16, said armature being arranged to rotate within the field produced by polyphase field windings 17 which are closed through a polyphase rheostat 18. The frequency changer 13 is self-driving by virtue of said field winding. The slip rings 16 of the converter 13 are connected to the supply mains 9 through an adjustable transformer 22. The brushes of the commutator 15 on the frequency-changer 13 are connected, respectively, to the mains 11 intermediate the two machines. The voltage applied to the system thus described may be adjusted, either by alteration of the supply voltage and of the phase-converter voltages or by the adjustment of a suitable transformer 23.

For the normal acceleration of the motors 5 and 6, the transformers 22 and 23 and the rheostat 12 may be adjusted by any suitable switching mechanism, either manually or power-operated. If power-operated, the switching may be done either electromagnetically or electropneumatically or in any other suitable manner. As the normal control system constitutes no part of the present invention, I have deemed it unnecessary to further illustrate the same.

For the proper load distribution on the motors 5 and 6, I provide auxiliary dynamo-electric machines of the induction type at 45 and 46 which operate in a somewhat similar manner to corresponding machines shown and described in my copending application, Serial No. 70,437, filed Jan. 5, 1916. The stator member of the machine 45 is fixed and is provided with a winding that is energized in accordance with the primary energization of the motor 5. The rotor winding of the machine 45 is connected to be energized in accordance with the secondary energy of the motor 5, as by connection to the mains 11.

The stator member of the machine 46 is movably mounted so as to be capable of rotation through a small arc and is provided with a winding which is connected to be energized in accordance with the primary energization of the motor 6. The rotor member of the machine 46 is provided with a winding which is connected to be energized in accordance with the secondary energy of the motor 6. The stator member of the machine 46 carries a moving contact member 47 which is adapted to make contact with fixed contact members 48 when in its upper position and with similar fixed contact members 49 when in its lowermost position. Said moving contact member 47 is normally biased to a mid position, as by springs 50.

When the circuit is closed between the contact members 48, energy flows from a suitable source 51 to operate a sander 52 to apply sand in front of the drive wheel 7. In like manner, when a circuit is established between the contact members 49, energy flows from the source 51 to energize a sander 53 and to apply sand in front of the drive wheel 8. Furthermore, the establishment of a circuit between the contact members 49 energizes a solenoid 54 and operates the rheostat 40 against a spring 55, increasing the secondary resistance of the motor 6.

Having thus described the arrangement of a system embodying my invention, the operation is as follows, bearing in mind the foregoing explanation. If the motor 5 slips, tending to lower the frequency in the mains 11, the frequency changer 13 operates to raise the frequency in said mains and to supply energy to the motor 6, the amount of said energy supply being adjustable by the transformer 22. If, on the other hand, the motor 6 slips, the frequency-changer 13 operates to lower the frequency on the mains 11 and, incidentally, to absorb energy from the secondary member on the motor 5 and to return the energy to the mains 9, the amount of return energy being subject to control by the transformer 22. If the motors 5 and 6 are similar, the effect of the frequency-changer 13 should be, at all times, to produce a frequency in the mains 11 which shall be somewhat less than 50% of the frequency in the mains 9. If the motors 5 and 6 are of dissimilar design or if it be desired to run them at slightly different speeds because of differences in the diameters of the drivers connected thereto, the appropriate modification in the frequency to be maintained on the mains 11 may be readily effected.

Thus, the machine 13 may be used in an extremely flexible manner to fix the frequency of the energy interchanged between the mains 11 and 9, to control the relative speeds and loads of the machines 5 and 6. As the machine 13 is called upon for transfer only the difference between the energy present in the main 11 and that desired therein, it may be of relatively small size for use over a wide range of variation.

When the motors 5 and 6 are operating with the predetermined load distribution, the ratio of the torques developed in the auxiliary machines 45 and 46 is such that the contact member 47 remains in substantially the mid position. If it now be assumed that the driver 7 slips, the machine 5 tends to rotate faster than is dictated by the predetermined speed ratio between the two main motors. This causes the development of a counter-clockwise motor torque in the machine 45 which is stronger than the clockwise generator torque or drag in the machine 46. This causes the stator of the machine 46 to be dragged around in a counter-clockwise direction against the springs 50 and to close the circuit between the contact members 48 and apply sand in front of the drive wheel 7. Furthermore, the slippage of the driver 7 and the consequent speeding up of the secondary member of the motor 5 causes said motor to lose its torque. This effect, in itself, in many cases, suffices to prevent slippage of the drive wheel 7, as an abnormal speeding up of the motor causes it to lose its driving torque and this action, in conjunction with the automatic sanding action suffices to maintain traction at the drive wheel 7 at all times.

If now, on the other hand, it be assumed that the drive wheel 8 slips, there is no tendency to underload the motor 6, as said motor is the last motor in a cascade connection and it is, therefore, necessary to temporarily increase the torque of the motor 6 in order to enable it to again pick up its load. The slippage of the drive wheel 8 permits the speeding up of the motor 6 and tends to produce a clockwise motor torque in the machine 46, this action being opposed by a generator drag in the machine 45. As a result, the stator of the machine 46 reacts in a clockwise direction, closing the circuit between the contacts 49 and energizing the sander 53 and the solenoid 54. The resistance of the rheostat 40 is temporarily increased, lowering the speed and increasing the torque of the motor 6 and, at the same time, sand is applied in front of the wheel 8, thus permitting the motor 6 to reassume its load. As soon as the predetermined load distribution is again obtained, circuit is broken at the contacts 49 and the spring 55 restores the rheostat 40 to its lowermost position, leaving the speed of the motor 6 subject to the control of the rheostat 12.

Referring now to the form of my invention shown in Fig. 2, four propulsion motors 5, 5', 6 and 6' are shown, the motors 5 and 5' being mechanically coupled and the motors 6 and 6' being similarly associated. I have shown said motors as mounted on the same shaft, in Fig. 2, for simplicity and clearness but, as actually employed, they would preferably be arranged in some such manner as is indicated in Fig. 3, the motors 5 and 5' being mounted upon one-half of a complete locomotive and being joined through connecting rods associated with the usual driving connections and the motors 6 and 6' being similarly mounted and joined on the remaining half of the locomotive. Polyphase supply mains 9 are provided for the energization of the respective motors, as in the system of Fig. 1, and the voltage supplied thereby may be adjusted, as by a transformer 23. A frequency-converter 13, somewhat similar to that of Fig. 1, is provided, together with an auxiliary transformer 22.

The primary member of the motor 5 is connected directly to the mains 9, and the secondary member of said motor may be connected to the primary member of the motor 5' through suitable mains 30 and a switch 31, when in its downward position. By throwing said switch 31 to its upper position, the primary member of the motor 5' may be connected directly to the mains 9: The secondary member of the motor 5 may be closed upon itself, as by suitable switches 32.

The secondary member of the motor 5' may be connected to the primary member of the motor 6' through a switch 33, when in its right-hand position, or by closing said switch 33 in its left-hand position, the primary member of the motor 6' may be connected directly to the mains 9. The secondary member of the motor 6' may be connected to the primary member of the motor 6 through a switch 34, when in its lower position, or the primary member of the motor 6 may be connected directly to the mains 9 through the switch 34, when in its upper position. The secondary member of the induction motor 6' may be closed upon itself by suitable switches 35.

The secondary member of the motor 5' may be connected to the slip rings of the frequency-changer 13 through a switch 36 when in its right-hand position or the secondary member of the motor 5' may be closed upon itself by closing the switch 36 in its left-hand position. The frequency-changer 13 is shown as of the non-self-propelled type, being driven, for example, by a direct-current motor 19 deriving energy from a source 20.

An auxiliary device 45—46 is provided for the automatic control of the load distribution, as in the system of Fig. 1.

In the operation of the system thus described, there are three distinct running speeds, as follows. For slow-speed operation, all four motors are connected in cascade by closing the switch 31 in its lower position, the switch 33 in its right-hand position and the switch 34 in its lower position. The machines 5 and 5' concatenate successfully, because of their mechanical interconnection, and, likewise, the machines 6 and 6'. The concatenated pair 5 and 5' may be caused to operate satisfactorily with the concatenated pair 6 and 6' by the manipulation of the frequency changer 13, in a manner analogous to that disclosed in connection with Fig. 1. Thus, the relative tractive efforts of the two halves of the locomotive shown in Fig. 3 may be equalized or otherwise regulated.

For intermediate-speed operation, the switches 33 and 36 may be thrown to their left-hand position, the other switches remaining in their former positions, whereby the motors 5 and 5' are concatenated to consume the entire supply voltage and the motors 6 and 6' are similarly arranged.

For high-speed operation, the switches 32 are closed, the switch 31 is thrown to its upper position, the switches 35 are closed and the switch 34 is thrown to its upper position, whereupon all the motors are connected in multiple for operation in the usual manner.

The speed control between said running positions may be obtained by varying the applied voltage, as at the transformer 23 or an adjustable rheostat 12 may be employed in the secondary circuit of the last motor, as is well known. As the details of the intermediate accelerating steps form no part of the present invention, I have not deemed it necessary to encumber the present showing by an illustration thereof.

The various switches illustrated in Fig. 2 are merely representative of many different forms of switching mechanism that may be employed and, in actual practice, the functions thereof would preferably be performed by power-actuated switches, either of the pneumatic or the electro-magnetically operated type under the control of a suitable master controller, but the specific means by which the switching operation is carried out forms no part of the present invention.

In both of the systems described, the motors may be operated in multiple without necessitating the use of the frequency changer 15 for the control of the load distribution therebetween and, under these conditions, the frequency-changer may be entirely disconnected or it may be associated with the systems solely to inject a leading-current component for the correction of the power-factor of the induction motors, in a well known manner.

In the recuperative operation of the system of Fig. 2, there are three stable and efficient recuperative speeds. All four motors may be operated in parallel, giving recuperation at substantially full speed, they may be operated in series-parallel cascade, providing recuperation at substantially one-half speed and, finally, all four motors may be operated in cascade giving recuperation at substantially one-quarter speed.

While I have shown and described my invention in its preferred forms, it will be obvious to those skilled in the art that it is susceptible of various minor changes and modifications without departing from the spirit thereof and I desire, therefore, that only such limitations shall be placed thereupon as are imposed by the prior art or as are specifically set forth in the appended claims.

I claim as my invention:

1. The combination with a source of alternating current, of two main, independently-rotatable induction motors, cascade connections from said source through said motors, and electro-responsive means whereby, if either motor tends to exceed a predetermined relative speed with respect to the other, the load thereon is increased, restoring the desired speed relation.

2. The combination with a source of alternating current, of two main, independently-rotatable induction motors, cascade connections from said source through said motors, and electro-responsive means whereby, if the last motor in said cascade set tends to exceed a predetermined relative speed with respect to the other motor, its secondary resistance is automatically and temporarily increased.

3. The combination with a railway vehicle provided with two propulsion motors of the induction type coupled to independently-rotatable driving-axles, of a source of alternating current, cascade connections from said source through said motors, and electro-responsive means whereby, if either motor tends to exceed its appropriate relative speed, the drivers coupled thereto are automatically sanded.

4. The combination with a railway vehicle provided with two propulsion motors of the induction type coupled to independently-rotatable driving-axles, of a source of alternating current, cascade connections from said source through said motors, and electro-responsive means whereby, if the last motor of said cascade connection tends to exceed its appropriate relative speed, its secondary resistance is automatically and temporarily increased.

5. The combination with a source of alternating current, of two main, independently-rotatable induction motors, cascade connections from said source through said motors, an auxiliary induction machine having its primary and secondary windings energized in accordance with the primary and secondary electromotive forces, respectively, of one of said main motors, an additional auxiliary induction machine having its primary and secondary windings energized in accordance with the primary and secondary electromotive forces, respectively, of the other of said main motors, said auxiliary machines being coupled together and designed so that their torques are equal and opposite when said main motors are operating with a predetermined speed relation, and means operated by said auxiliary machines whereby, if either main motor exceeds its appropriate speed relation, its torque is automatically increased.

6. The combination with a source of alternating current, of two main, independently-rotatable induction motors, cascade connections from said source through said motors, an auxiliary induction machine having its primary and secondary windings energized in accordance with the primary and secondary electromotive forces, respectively, of one of said main motors, an additional auxiliary induction machine having its primary and secondary windings energized in accordance with the primary and secondary electromotive forces, respectively, of the other of said main motors, said auxiliary machines being coupled together and designed so that their torques are equal and opposite when said main motors are operating with a predetermined speed relation, and means operated by said auxiliary machines whereby, if the last motor in said cascade connection exceeds its appropriate relative speed, its secondary resistance is temporarily increased.

7. The combination with a railway vehicle provided with two propulsion motors of the induction type coupled to independently-rotatable driving-axles, of a source of alternating current, cascade connections from said source through said motors, an auxiliary induction machine having its primary and secondary windings energized in accordance with the primary and secondary electromotive forces, respectively, of one of said main motors, an additional auxiliary induction machine having its primary and secondary windings energized in accordance with the primary and secondary electromotive forces, respectively, of the other of said main motors, said auxiliary machines being coupled together and designed so that their torques are equal and opposite when said main motors are operating with a predetermined speed relation, and means operated by said auxiliary machines whereby, if either main motor exceeds its appropriate speed relation, the drivers coupled thereto are automatically sanded.

8. The combination with a railway vehicle provided with two propulsion motors of the induction type coupled to independently-rotatable driving-axles, of a source of alternating current, cascade connections from said source through said motors, an auxiliary induction machine having its primary and secondary windings energized in accordance with the primary and secondary electromotive forces, respectively, of one of said main motors, an additional auxiliary induction machine having its primary and secondary windings energized in accordance with the primary and secondary electromotive forces, respectively, of the other of said main motors, said auxiliary machines being coupled together and designed so that their torques are equal and opposite when said main motors are operating with a predetermined speed relation, and means operated by said auxiliary machines whereby, if the last motor in said cascade connection exceeds its appropriate relative speed, its secondary resistance is temporarily increased.

In testimony whereof, I have hereunto subscribed my name this 30th day of July, 1917.

RUDOLF E. HELLMUND.